United States Patent
Khal et al.

(10) Patent No.: US 8,991,752 B2
(45) Date of Patent: Mar. 31, 2015

(54) APPARATUS FOR PRE-ROTATING AIRCRAFT TIRES

(75) Inventors: Sami Khal, Las Vegas, NV (US); Anis Khal, Gresham, OR (US)

(73) Assignee: Aerospin Corporation, Portland, OR (US)

( * ) Notice: Subject to any disclaimer, the term of this patent is extended or adjusted under 35 U.S.C. 154(b) by 420 days.

(21) Appl. No.: 13/559,296

(22) Filed: Jul. 26, 2012

(65) Prior Publication Data

US 2013/0112809 A1    May 9, 2013

Related U.S. Application Data

(60) Provisional application No. 61/628,746, filed on Nov. 7, 2011.

(51) Int. Cl.
*B64C 25/40*    (2006.01)

(52) U.S. Cl.
CPC ..................... *B64C 25/40* (2013.01)
USPC ...................................................... 244/103 S

(58) Field of Classification Search
USPC ................... 244/103 S, 103 R, 100 R
See application file for complete search history.

(56) References Cited

U.S. PATENT DOCUMENTS

| | | | | |
|---|---|---|---|---|
| 1,225,181 A | * | 5/1917 | Schleicher | 152/155 |
| 2,312,159 A | * | 2/1943 | Gulotta | 244/103 S |
| 2,333,447 A | * | 11/1943 | Schippel | 244/103 S |
| 2,377,280 A | * | 5/1945 | Stratton | 244/103 S |
| 2,397,319 A | * | 3/1946 | Johnson, Jr. | 244/103 S |
| 2,410,622 A | * | 11/1946 | Backstrom | 244/103 S |
| 2,412,406 A | * | 12/1946 | Kerezi et al. | 244/103 S |
| 2,418,064 A | * | 3/1947 | Austin | 244/103 S |
| 2,435,801 A | * | 2/1948 | Shively | 244/103 S |
| 2,439,033 A | * | 4/1948 | Antonson | 244/103 S |
| 2,457,897 A | * | 1/1949 | Hull et al. | 244/103 S |
| 2,457,899 A | * | 1/1949 | Hursh | 244/103 S |
| 3,233,849 A | | 2/1966 | Rubin | |
| 3,529,792 A | | 9/1970 | Macmahon | |
| 3,773,283 A | | 11/1973 | Abplanalp | |
| 3,797,786 A | | 3/1974 | House | |
| 4,040,582 A | | 8/1977 | Krauss | |
| 4,061,294 A | | 12/1977 | Hawkins | |
| 4,205,812 A | * | 6/1980 | McSweeney | 244/103 S |
| 4,732,350 A | | 3/1988 | Lamont | |
| 5,104,063 A | | 4/1992 | Hartley | |
| 5,165,624 A | | 11/1992 | Lewis, Jr. | |
| 5,213,285 A | | 5/1993 | Stanko | |
| 5,417,387 A | | 5/1995 | Jennings | |
| 5,746,393 A | | 5/1998 | Gennaro | |
| 6,032,900 A | | 3/2000 | Smith | |
| 6,086,017 A | | 7/2000 | Al-Thani | |
| 6,983,911 B1 | | 1/2006 | Nordquist | |
| 2004/0065771 A1 | * | 4/2004 | Snyder | 244/10 |

FOREIGN PATENT DOCUMENTS

GB    2229685 A  * 10/1990    B64C 25/40

* cited by examiner

*Primary Examiner* — Tien Dinh
*Assistant Examiner* — Michael A Fabula
(74) *Attorney, Agent, or Firm* — Mersenne Law LLP

(57) ABSTRACT

A disc-shaped accessory having radially-hinged flaps is adapted to be attached to an aircraft wheel. The flaps open no more than 90° (preferably 45-70°) in an airstream to exert a rotational torque on the wheel, causing the wheel to spin. The rotation helps reduce tire wear and damage during aircraft landing.

12 Claims, 6 Drawing Sheets

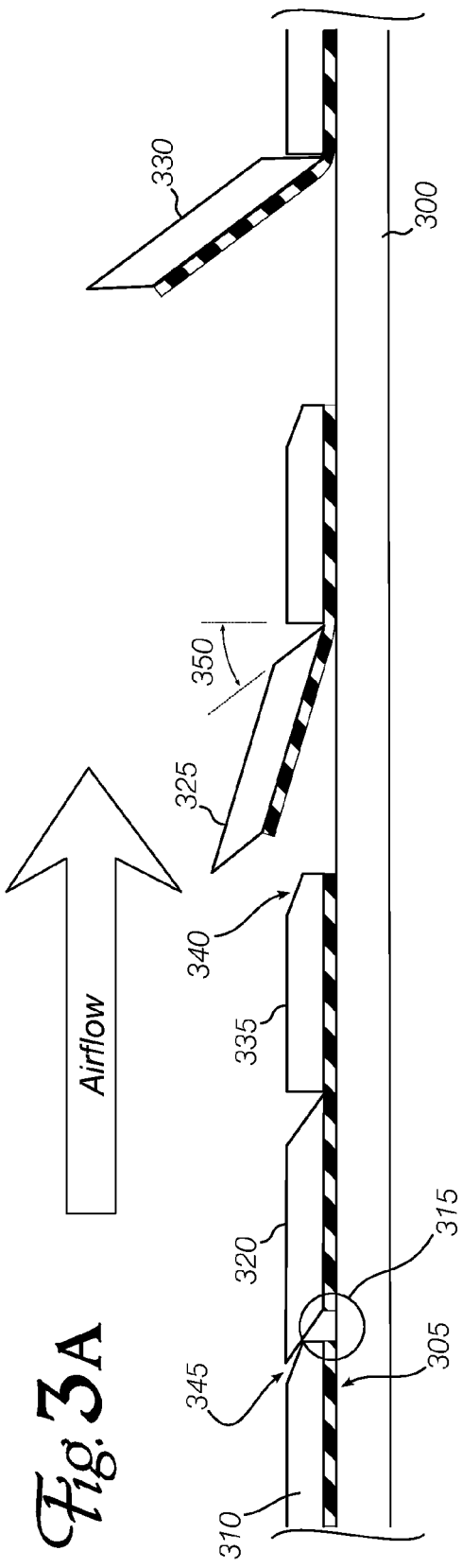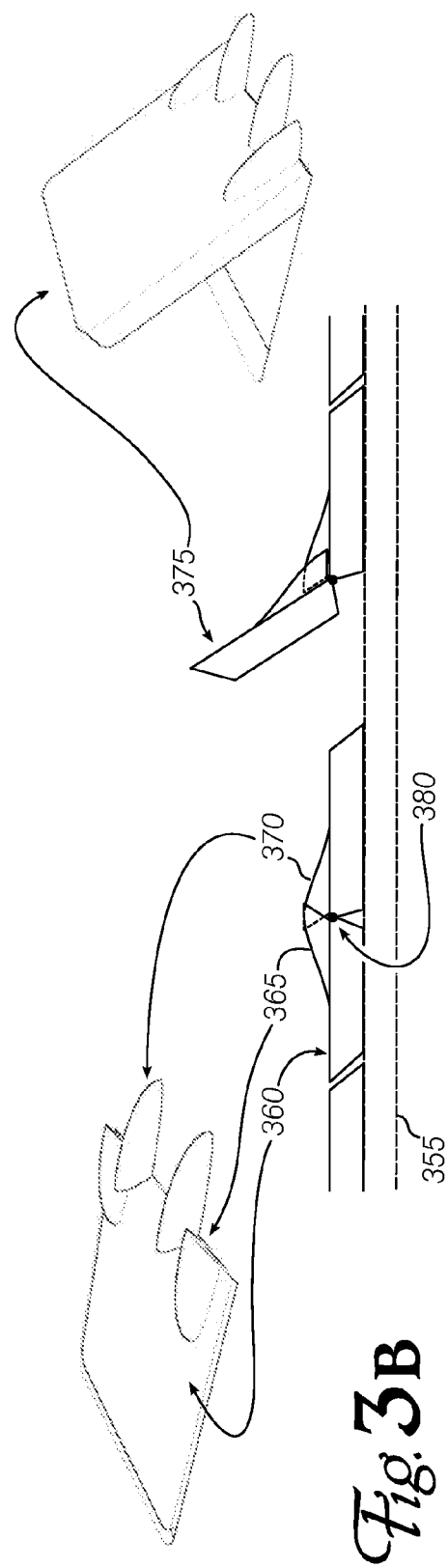

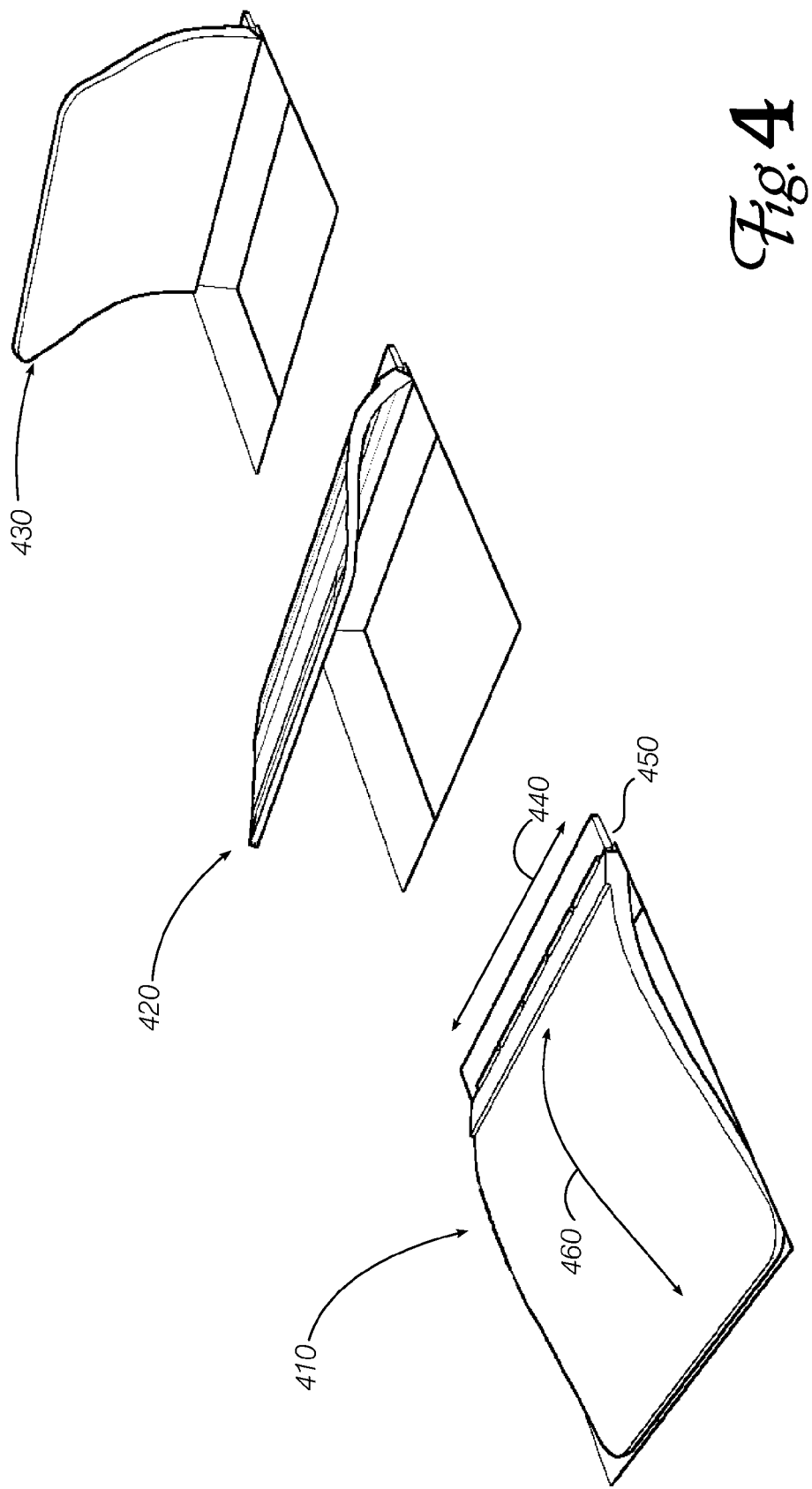

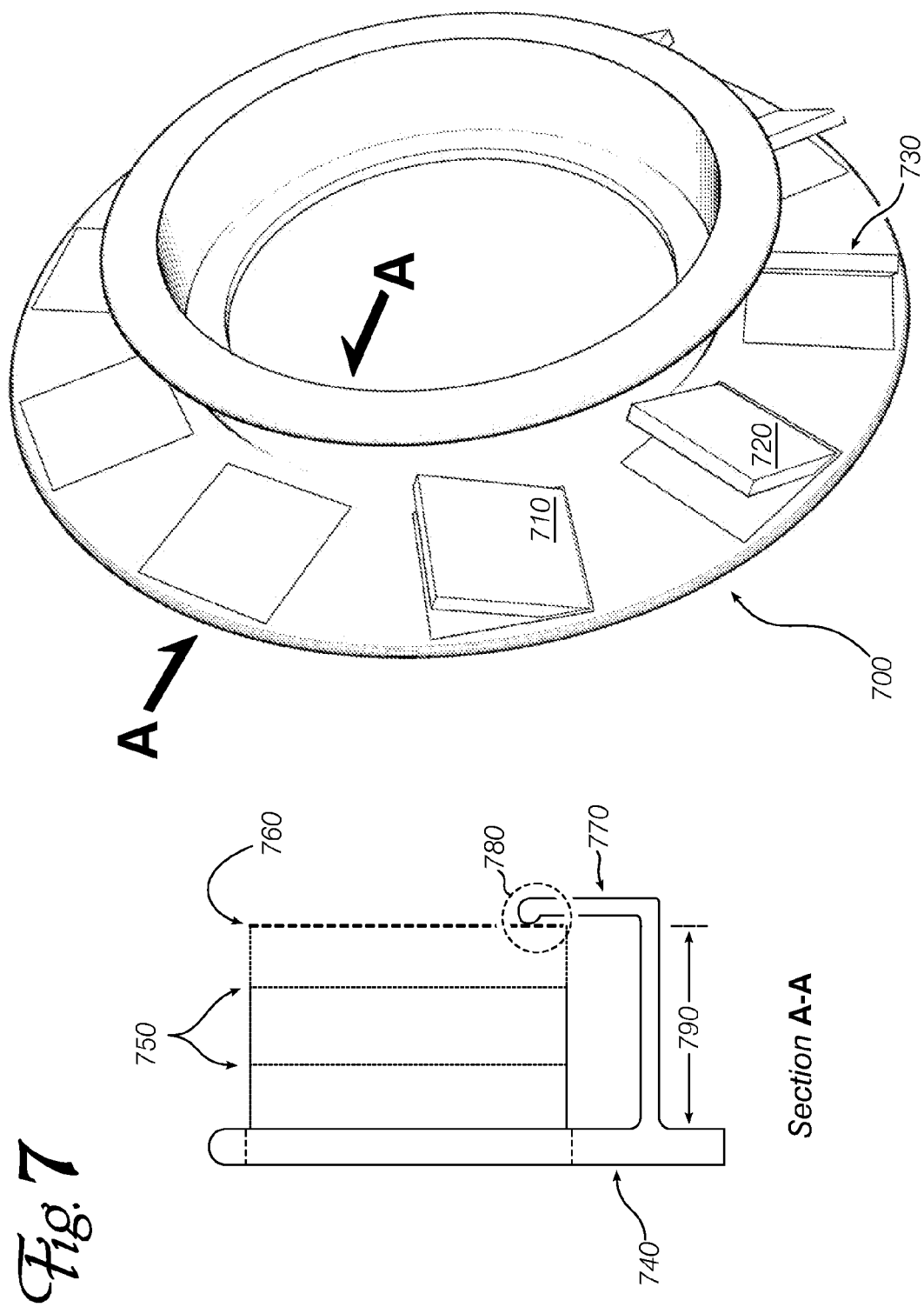

APPARATUS FOR PRE-ROTATING AIRCRAFT TIRES

CONTINUITY AND CLAIM OF PRIORITY

This is an original U.S. patent application that claims priority to U.S. provisional application No. 61/628,746 filed 7, Nov. 2011.

FIELD

The invention relates to auxiliary equipment for aircraft landing gear. More specifically, the invention relates to wheel-mounted accessories to cause the wheels to begin rotating before they strike the ground during landing.

BACKGROUND

The vast majority of aircraft land on solid—and often paved—surfaces, using three or more wheels (a 747-400, for example, has 18 wheels in four sets of four, with two additional wheels at the nose). The wheels are typically shod with tires of more-or-less conventional heavy-duty construction.

Aircraft landings place significant stresses on landing-gear tires: a plane may land at a speed of 80-150 mph (128-240 km/h), yet when the tires touch down, they are scarcely turning. Therefore, they must spin up from a standstill to match the landing speed very quickly, and until they do, they skid along the runway, burning off rubber tread, creating flat spots and occasionally destroying a tire. (Runways commonly have a black skid-marked segment at one end where most planes touch down, and photos of planes landing often show clouds of smoke from the skidding tires.)

A number of devices and systems have been proposed to reduce landing-related wear on tires by accelerating, spinning or pre-rotating the wheels of an aircraft in preparation for landing. However, none of these have achieved significant commercial success, possibly due to excessive mechanical complexity, weight and/or inadequate durability. A new design that helps pre-rotate aircraft tires for landing may offer longer tire life, improved landing safety, reduced parts fatigue and maintenance cost, and other benefits for aircraft owners and operators.

SUMMARY

Embodiments of the invention are resilient disc-shaped accessories, adapted to be secured to an aircraft landing-gear wheel, with passive, automatically retracting flaps or vanes that open when exposed an airstream to apply a rotational force to the wheel.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 3A and 3B show alternate flap constructions and mechanisms for limiting the maximum opening angle.

FIGS. 4-6 show alternate flap surface profiles.

FIG. 7 shows an alternate flap opening-limit construction.

DETAILED DESCRIPTION

Figure 1:
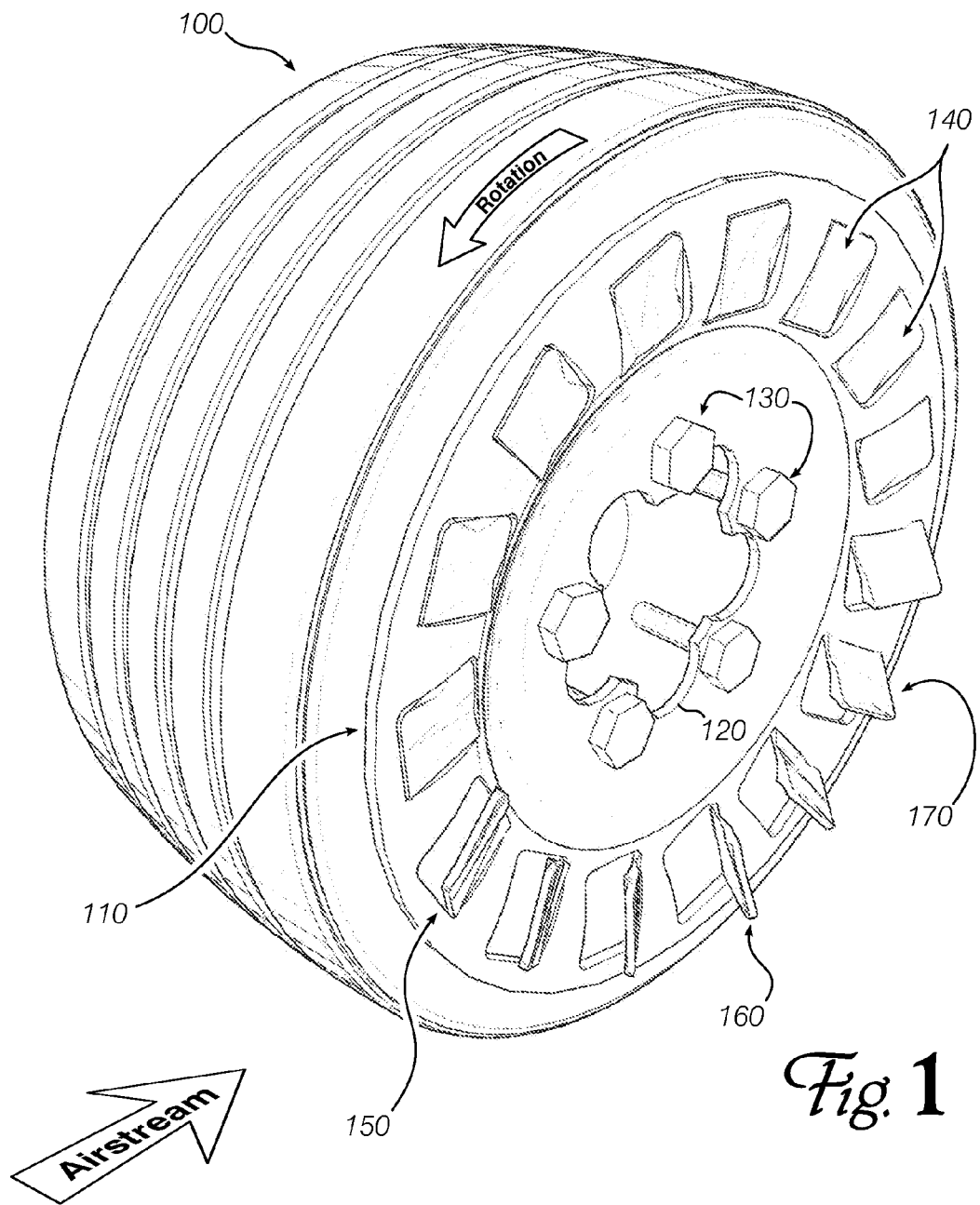
FIG. 1 is a perspective view of a basic embodiment of the invention, installed on a sample wheel.

FIG. 1 shows a typical embodiment of the invention, installed on a sample wheel/tire 100. The embodiment is a generally disc-shaped structure 110, slightly smaller than the tire (preferably between about 70% and 90% of the tire diameter), and attached to the tire/wheel assembly so that the outer circumference of the embodiment rests firmly against the sidewall of the tire. In many embodiments, the disc has a convex outside shape (and corresponding concave inside shape). This shape causes the embodiment to be "over-fitted" to the tire, so that when the embodiment is attached, the flattening of the resilient disc provides extra spring force to hold the outer circumference against the tire sidewall. The outer circumference of the disc may include a thicker, weighted "ring" to provide a centrifugal force to reset a disc that has been "flipped" (overextended clue to a hard landing, causing the disc to curve away from the tire sidewall, instead of towards it).

This embodiment has a central opening 120 to provide access to the wheel, bearing, and other parts of the landing gear, and is held against the tire by bolts 130. In installations where the landing-gear axle does not extend through the embodiment disc, the central opening need not be provided.

Moveable flaps or vanes 140 are positioned around the perimeter of the disc. The flaps are attached at one side to the disc, but are free to rotate about the attachment point, like a door about a door hinge. The hinge lines are oriented roughly parallel to radii of the disc. Above the horizontal centerline of the wheel, the flap hinge leads the flap into the airstream, so the flaps tend to remain closed. However, below the horizontal centerline of the wheel, air can begin to enter behind the flap and push it open (in this Figure, flap 150 is shown starting to open). At the bottom of the wheel, airflow pushes the flaps fully open, as shown at 160. Finally, toward the trailing edge of the wheel, the airstream exerts less "opening" force on the flaps, so they return to their closed position (170).

Since the open flaps at the bottom of the wheel present greater wind resistance than the closed flaps at the top, the wheel experiences a torque that tends to cause it to rotate in the direction shown. When the wheel does rotate, the flaps continue to open and close automatically as they are exposed to the airstream. The longer a wheel equipped with an embodiment of the invention is exposed to the airstream, the faster it tends to spin (at least until the vanes at the bottom of the wheel approach the speed of the airstream). Thus, an embodiment of the invention can help spin up an aircraft wheel in preparation for landing.

The flaps of an embodiment are sized and positioned to prevent excessive speed in pre-rotation, under normal aircraft flight conditions. For example, a large flap located closer to the wheel's axle might cause the wheel to spin faster than the aircraft's landing speed. With flaps located closer to the wheel's outer circumference, this is less likely to happen. (In fact, as the wheel rotates closer and closer to the airspeed, there is less relative airflow to cause the flaps to stand up. Thus, embodiments are self-limiting in speed.)

Figure 2:
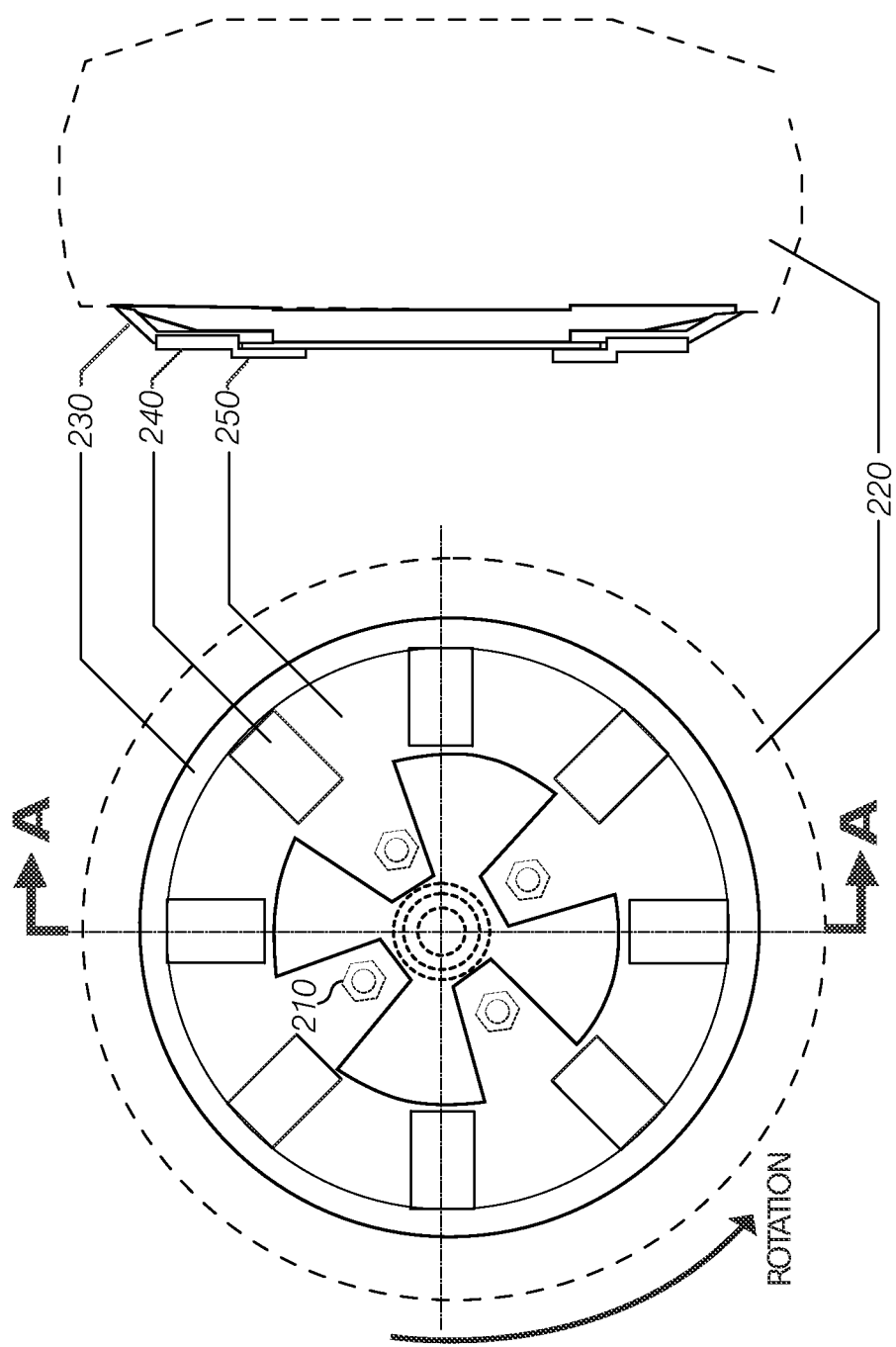
FIG. 2 is a plan view of an embodiment with a section therethrough.

FIG. 2 shows a side view and a section (A-A) through another embodiment of the invention. In this figure, an alternate internal opening shape is visible; the main body of the disc is attached to the wheel via four bolts 210. The dashed outline 220 indicates the outer circumference of the tire. Disc 230 rests against the sidewall of the tire. There are eight (8) flaps 240 in this embodiment, each hinged by a radiallyoriented hinge at the counter-clockwise edge of the flap. A wheel flange 250 holds the device to the wheel and against the tire.

The flaps or vanes of an embodiment impart a rotational torque to the wheel by standing up in the airstream over part of the device's circumference. The flaps should not be permitted to open beyond 90° (and in many embodiments, a maximum opening of 45-75° is preferred). FIGS. 3A and 3B show two different structures that can limit the flap opening as desired. Both figures show flaps in various stages of opening. The view is from the edge of the disc towards the center, as if the outer portion of the disc had been removed to expose the flaps and hinge structures. The Airflow indication refers to airflow across the disc below the wheel axle, so the flaps are being forced open to turn the wheel. Airflow above the wheel axle is in the reverse direction (relative to the flap orientation) so the flaps will be held closed.

In FIG. 3A, the disc is formed of a laminate of three layers: a flexible resin plastic base 300 with a Kevlar-type material 305 (the striped layer) bonded thereto. The top layer 310 may be formed of a similar or identical material as the base; it is also bonded to Kevlar 305. Fins or flaps are formed in the top layer, and the Kevlar layer is cut on three of four sides of each fin, leaving one uncut segment to act as a hinge for the fin. (Only one of these cuts is visible in this view; it is circled at 315. The other two cuts are either outboard or inboard of the view plane.) In some embodiments, the flaps may be secured to the underlying Kevlar layer with stitching (as well as, or in lieu of, adhesive and/or thermoplastic bonding).

The cuts around the free (non-hinge) sides of each flap should leave an adequate gap so that the flap does not get stuck in the closed position due to deformation or damage to the apparatus. A gap of at least 3-5 mm is preferred, although a larger gap may be required on heavier-duty embodiments for use on larger wheels. In this figure, left-most fin 320 is closed, middle fin 325 is starting to open, and right-most fin 330 is fully open. The flat, five-sided blocks between the fins (one of which is identified at 335) comprise the stationary part of the disc (other parts of which are secured to the wheel). The portion of the block adjacent the trailing edge of a closed fin (e.g., 340) may be angled differently than the trailing edge of the fin to create a gap 345 when the fin is closed. This gap may help the airstream lift the fin. In some embodiments, the trailing edge of each fin may have a convex scallop or scoop formed therein, so that the airstream can enter and force the fins to stand up. (When referring to the flaps or fins, there is a possible ambiguity between the "leading" and "trailing" edges, since the direction of airflow over each flap changes depending on whether the flap is above or below the horizontal centerline of the wheel. In this Specification, the "leading" edge of a flap is specifically defined to be the edge of the flap at the hinge line. This edge also "leads" into the airstream when the wheel rotates so the flap is above the wheel's centerline. The "trailing" edge of a flap is the edge opposite the leading edge, and is the portion of the flap that opens to catch the airstream below the wheel's centerline.)

As the fins rotate below the wheel centerline, the airstream begins to pick them up. The more they stand up, the more force the airstream exerts. Fully-erect fins (e.g., 330) stand up at an angle 350 set by the leading edge of the fin and the trailing edge of the block downwind of the fin. Note that the Kevlar layer functions as a hinge between each fin and its downwind stationary block.

Some laminated embodiments may include a metal layer for improved strength or reliability. In such implementations, it is preferred that the metal not extend to the edge of the disc, so that it poses less risk of damaging the tire sidewall. It is appreciated that the use of Kevlar-type materials in laminates such as described here offers safety and impact-resistance benefits. For example, an embodiment may provide bullet resistance in military applications.

FIG. 3B shows an embodiment with a different flap configuration. There may be a base substrate 355 (of a material like that discussed above, or of metal). Left flap 360 is shown in the closed position. The flap has a spur or spine 365 formed into its outside surface, and the stationary part of the disc has a complementary spine 370. The perspective-view inset drawing shows how these spines may be arranged on the flap and adjacent surface. For example, there may be a plurality of interleaved spines. It is preferred to have two or more spines.

The spines may extend toward the free end of the flap to provide support for the flap, and the spine end near the hinge limits the maximum opening angle of the flap. Right-hand fin 375 is shown in the open position, and the action of the spines in preventing further opening is apparent in the second perspective-view inset drawing. In this embodiment, the hinge is formed with the flaps and the rest of the disc surface by scoring or thinning the material along the hinge line. The position of the hinge (seen end-on) is shown by the black clot at 380. The actual material that forms the hinge, seen from this angle, is much smaller than the clot.

FIG. 4 shows three flaps of another embodiment in various stages of opening. Left flap 410 is closed, while flap 420 is partly open, and flap 430 is fully open. The hinge of each flap is straight 440 and oriented roughly parallel to a radius of the disc. In this embodiment, a separate hinge structure 450 is used to attach each flap to the disc. The flaps in this embodiment have a curved, airfoil-shaped profile 460 so that airflow over the flap creates a low-pressure region or "lift" to help the flap stand up.

Figure 5:
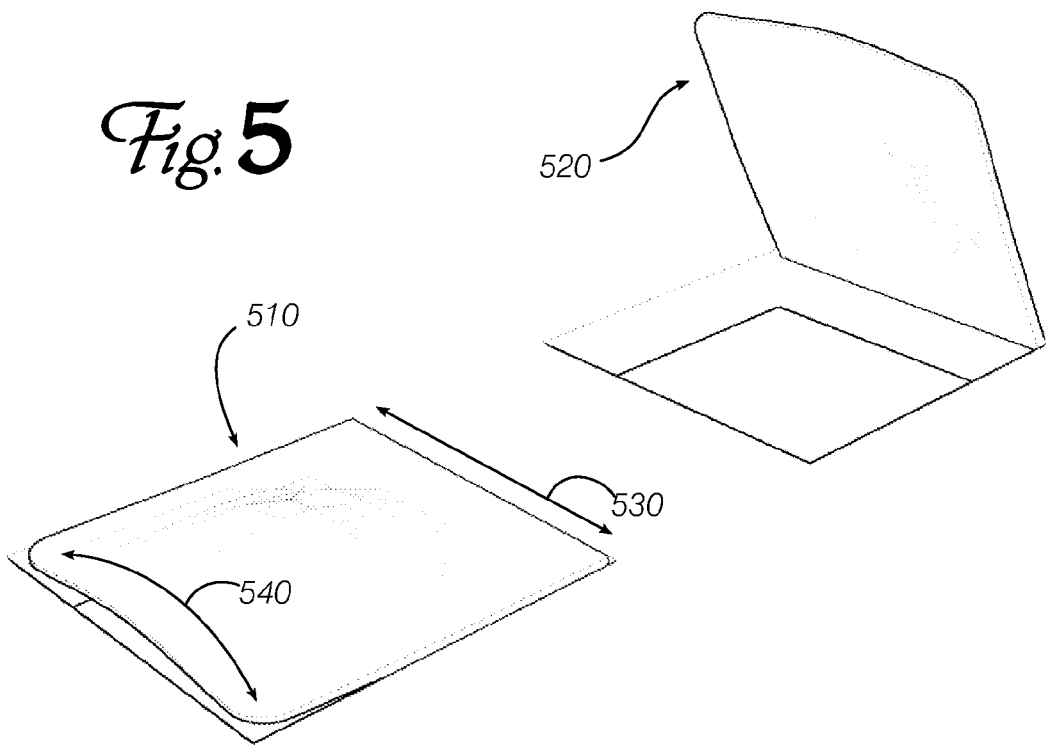
Figure 6:
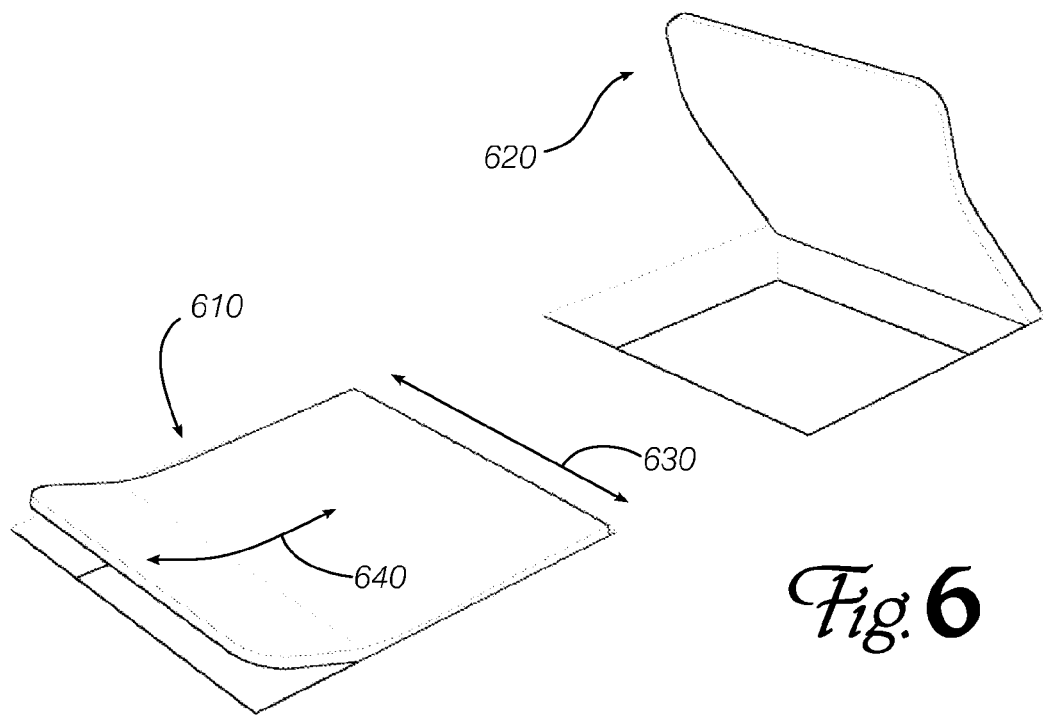

FIGS. 5 and 6 show each show two flaps of other embodiments. One flap (510, 610) is closed, while the other (520, 620) is open. As with most embodiments, the hinge line of a flap (530, 630) is straight (and oriented roughly parallel to a radius of the disc). However, in the embodiment of FIG. 5, the trailing edge of the flap is cupped or scalloped as indicated at 540 to help it catch air and open over the portion of the disc where the airstream is flowing from the trailing edge of the flap towards its leading edge or hinge line. In this Figure, the axis of curvature for the scallop is perpendicular to the hinge line.

FIG. 6 shows another two flaps of an embodiment. As in FIG. 5, one flap 610 is closed, while the other 620 is open. Again, the hinge line 630 is straight, while the trailing edge of the flap is raised (640). In this embodiment, the axis of curvature of the flap is roughly parallel to the hinge line.

In some embodiments, each flap will have the same profile, while in other embodiments, a mixture of profiles may be used. The arrangement of dissimilar-profiled flaps around the circumference of the disk is preferably symmetrical. For example, every other flap could have either a first or a second different profile; or every third flap could have one of a first, second or third different profile. It is preferred that all the flaps, regardless of surface profile, be distributed symmetrically around the circumference of the disc.

FIG. 7 shows another embodiment of the invention. In the perspective view (generally at 700) the disc, flaps, and a flap restraining structure are visible. Flap 710 is starting to open; flap 720 is open further, and flap 730 is fully open.

At 740, a profile section at A-A is shown. Dashed lines 750 show the trailing edge of a flap at various openings (less than fully open), while heavier dashed line 760 shows the trailing edge of a fully-open flap. In this embodiment, further opening of a flap is prevented by a restraining or limiting structure 770;

note that a portion of the structure interferes with and prevents further opening of the flap (see 780). The maximum opening permitted by the structure is controlled by the height of the structure or the distance 790 between the surface of the disc and the blocking part of the restraining structure. In geometrical terms, the maximum angle of flap opening is roughly equal to the arcsine of the length of the flap (from leading or hinged edge to trailing edge) divided by the height of the restraining structure.

The embodiments depicted in FIGS. 1 and 2 attach to an aircraft wheel using bolts, but other embodiments may be secured using clips, cams or other fastening mechanisms. Since the embodiments apply torque to the wheel in only one direction, one potential fastening system is clips that secure in one rotational direction (the same direction as the force that the embodiment applies to the wheel). If the embodiment is turned in the opposite direction, the clips disengage and the embodiment can be removed from the wheel. In bolt-attached embodiments, it is not necessary for every wheel bolt to pass through the disc also. Some embodiments may be attached using bolts that serve only to attach the embodiment (i.e., separate and distinct bolts may secure the wheel to the landing gear).

The features and characteristics of the present invention have been described largely by reference to specific examples and in terms of particular physical embodiments. However, those of skill in the art will recognize that aircraft tire pre-rotation can also be achieved by devices of different arrangements that nevertheless comprise the novel features described herein. Such variations and different implementations are understood to be captured according to the following claims.

We claim:

1. A passive, airflow-activated aircraft tire pre-rotation accessory comprising:
    a circular disc;
    a plurality of hinged flaps spaced around the circular disc near an outer circumference thereof, each hinged flap having a hinge oriented substantially parallel with a radius of the circular disc; and
    means for attaching the circular disc to a wheel carrying an aircraft tire;
    wherein said disc is smaller than the aircraft tire;
    wherein said circular disc comprises a laminate of at least three layers bonded together over at least parts of their surfaces, said layers including:
        a flexible resin plastic base;
        a Kevlar-type intermediate layer; and
        a flexible resin plastic top layer; and,
    wherein the flaps are formed in the flexible resin plastic top layer and the Kevlar-type intermediate layer forms the hinge at a leading edge of each flap.

2. The passive, airflow-activated aircraft tire pre-rotation accessory of claim 1, further comprising:
    means for limiting an opening of each of the hinged flaps.

3. The passive, airflow-activated aircraft tire pre-rotation accessory of claim 2, wherein the means for limiting an opening is an angle between a leading edge of the flap and a trailing edge of an adjacent portion of the circular disc.

4. The passive, airflow-activated aircraft tire pre-rotation accessory of claim 2, wherein the means for limiting an opening is a ring, concentric with and secured at a distance to the disc,
    wherein an outer circumference of the ring overlaps a portion of the flaps,
    wherein the distance between an outer surface of the disc and the ring is less than a length of a flap multiplied by a sine of a maximum opening angle of the flap.

5. An aircraft wheel pre-rotation device comprising:
    a circular disc adapted to be secured to an aircraft wheel;
    a plurality of moveable flaps arranged symmetrically around an outer portion of the circular disc,
    wherein each moveable flap is free to rotate about a hinge line oriented roughly parallel to a radius of the disc, from a closed position substantially in a plane with the circular disc, to an open position at an angle less than 90° from the plane of the circular disc; and
    a flap-restraining structure having a restraining ring concentric with the circular disc, planes of the circular disc and the restraining ring being parallel, said restraining ring held fixed at a distance from the circular disc, and an outer circumference of the restraining ring overlaps a swing path of each moveable flap so that the restraining ring prevents each moveable flap from opening further than the angle less than 90°.

6. The aircraft wheel pre-rotation device of claim 5, wherein each moveable flap has a surface profile with an airfoil shape, an axis of curvature of the airfoil shape being roughly parallel to the hinge line of the moveable flap.

7. The aircraft wheel pre-rotation device of claim 5, wherein each moveable flap has a surface profile with a raised trailing edge, an axis of curvature of the flap being roughly parallel to the hinge line of the moveable flap.

8. The aircraft wheel pre-rotation device of claim 5, wherein each moveable flap has a surface profile with a scalloped shape, an axis of curvature of the flap being roughly perpendicular to the hinge line of the moveable flap.

9. The aircraft wheel pre-rotation device of claim 5, wherein the angle less than 90° is an angle between 45° and 75°.

10. The aircraft wheel pre-rotation device of claim 5, further comprising:
    a hinge for each flap, formed by a reduced-thickness portion of the circular disc along the hinge line.

11. The aircraft wheel pre-rotation device of claim 5, wherein the circular disc is formed of a laminate of a plurality of materials, one material being a Kevlar-like material, the device further comprising:
    a hinge, for each flap, formed by a material separation of the laminate along the hinge line to expose the Kevlar-like material at a leading edge of a flap, the Kevlar-like material thus forming a flexible hinge.

12. The aircraft wheel pre-rotation device of claim 5, wherein a diameter of the circular disc is between about 70% and about 90% of a diameter of the aircraft wheel including a tire mounted thereupon.

* * * * *